US008975805B2

(12) United States Patent
Kim et al.

(10) Patent No.: US 8,975,805 B2
(45) Date of Patent: Mar. 10, 2015

(54) ELECTRICAL ENERGY GENERATOR

(75) Inventors: Sung-min Kim, Yongin-si (KR);
Seung-nam Cha, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 553 days.

(21) Appl. No.: 13/396,208

(22) Filed: Feb. 14, 2012

(65) Prior Publication Data

US 2012/0223617 A1    Sep. 6, 2012

(30) Foreign Application Priority Data

Mar. 3, 2011 (KR) .................. 10-2011-0019092

(51) Int. Cl.
*H01L 41/113* (2006.01)

(52) U.S. Cl.
USPC ........................................... 310/339

(58) Field of Classification Search
USPC ........................................... 310/339
See application file for complete search history.

(56) References Cited

U.S. PATENT DOCUMENTS

| 6,621,083 | B2 | 9/2003 | Cole |
| 7,705,523 | B2 | 4/2010 | Wang et al. |
| 2006/0189018 | A1 | 8/2006 | Yi et al. |
| 2010/0066208 | A1* | 3/2010 | Choi et al. ............ 310/339 |
| 2010/0117488 | A1 | 5/2010 | Wang et al. |
| 2010/0127255 | A1 | 5/2010 | Allen et al. |
| 2010/0314617 | A1* | 12/2010 | Ito ............................ 257/43 |
| 2011/0050042 | A1 | 3/2011 | Choi et al. |
| 2011/0163292 | A1* | 7/2011 | Wang et al. ............... 257/13 |
| 2011/0163636 | A1 | 7/2011 | Sirbuly et al. |
| 2011/0180783 | A1* | 7/2011 | Gao ............................ 257/15 |
| 2012/0225196 | A1 | 9/2012 | Choi et al. |

FOREIGN PATENT DOCUMENTS

| EP | 2290718 A2 | 3/2011 |
| KR | 2003-0063489 A | 7/2003 |
| KR | 2009-0049008 A | 5/2009 |
| WO | WO-2007076254 A2 | 7/2007 |

OTHER PUBLICATIONS

European Search Report for corresponding European Application No. 12 15 7643 dated Jun. 4, 2014.

* cited by examiner

*Primary Examiner* — Thomas Dougherty
(74) *Attorney, Agent, or Firm* — Harness, Dickey & Pierce, PLC

(57) ABSTRACT

According to an example embodiment, an electrical energy generator includes at least one piezoelectric structure, a semiconductor layer and a contact layer. The at least one piezoelectric structure includes a material having piezoelectric characteristics. One surface of each piezoelectric structure forms a p-n junction with the semiconductor layer. The other end of each piezoelectric structure contacts the contact layer that is formed of a material having metal-insulator transition (MIT) characteristics. The piezoelectric structure may be an elongated member, such as a nanowire.

20 Claims, 5 Drawing Sheets

ELECTRICAL ENERGY GENERATOR

CROSS-REFERENCE TO RELATED APPLICATIONS

This application claims priority to the benefit under 35 U.S.C. §119 of Korean Patent Application No. 10-2011-0019092, filed on Mar. 3, 2011 in the Korean Intellectual Property Office, the disclosure of which is incorporated herein in its entirety by reference.

BACKGROUND

1. Field

Some example embodiments relate to electrical energy generators, and more particularly to hybrid electrical energy generators that can transform sunlight and/or mechanical vibration energy into electrical energy.

2. Description of the Related Art

Solar cells may transform solar energy into electrical energy. Solar cells may include a p-type semiconductor material and an n-type semiconductor material. When light is directed onto a solar cell, solar cells may generate electrons and holes. The generated electrons and holes may move to an n-type electrode and a p-type electrode respectively, thereby generating electrical energy. Researchers are researching whether using nanostructures, such as nanowires, may improve the efficiency of solar cells.

A hybrid electrical energy generator may transform sunlight or mechanical vibration into electrical energy according to a surrounding environment. A hybrid electrical energy generator may have a structure in which a photovoltaic element and a piezoelectric element are integrated together, and thus a photovoltaic effect and a piezoelectric effect may occur together or separately. In a hybrid electrical energy generator, electrical energy can be generated by using two different energy generation methods: a photovoltaic method and a piezoelectric method. However, the electrode contact characteristics desired for the photovoltaic method are different from those desired for the piezoelectric method. For example, ohmic contact characteristics may be desirable for the photovoltaic method and Schottky contact characteristics may be desirable for the piezoelectric method.

SUMMARY

Some example embodiments relate to hybrid electrical energy generators for transforming sunlight and/or mechanical vibration into electrical energy.

According to an example embodiment, an electrical energy generator includes a first substrate, a second substrate over the first substrate, a plurality of elongated members between the first substrate and the second substrate, and a contact layer on one of the first substrate and the second substrate. The plurality of elongated members include at least one elongated member containing a piezoelectric material. The contact layer includes a material having metal-insulator transition (MIT) characteristics. The contact layer may form a contact with a first end of the at least one elongated member containing a piezoelectric material.

One of the first substrate and the second substrate may include a semiconductor layer. A second end of the at least one elongated member may form a p-n junction with the semiconductor layer.

The at least one elongated member containing a piezoelectric material may be a nanowire including a n-type semiconductor material. The semiconductor layer may include a p-type semiconductor material.

The at least one elongated member containing a piezoelectric material may be a nanowire including a p-type semiconductor material. The semiconductor layer may include a n-type semiconductor material.

The plurality of elongated members may include nanowires.

The plurality of nanowires may include one of zinc oxide (ZnO), lead zirconate titanate (PZT), and polyvinylidene fluoride (PVDF).

The material having metal-insulator-transition (MIT) characteristics may include a material in which contact characteristics vary based on temperature variation.

The contact between the first end of the at least one elongated member containing a piezoelectric material and the contact layer may be an ohmic contact at a temperature above a transition temperature of the material having metal-insulator transition (MIT) characteristics. The contact between the first end of the at least one elongated member containing a piezoelectric material and the contact layer may be a Schottky contact at a temperature below a transition temperature of the material having metal-insulator transition (MIT) characteristics.

The contact layer may include vanadium oxide.

At least one of the first substrate and the second substrate may include a transparent deformable material.

One of the first substrate and the second substrate may include a semiconductor layer. The semiconductor layer may include at least one of an inorganic material, and an organic material.

The plurality of elongated members may be one of aligned substantially perpendicular to one of the first substrate and the second substrate, and aligned at a non-perpendicular and non-parallel angle to one of the first substrate and the second substrate.

According to an example embodiment, an electrical generator includes a semiconductor layer, at least one piezoelectric structure containing a piezoelectric material, and a contact layer. The piezoelectric structure includes a first surface that forms a p-n junction with the semiconductor layer. The contact layer forms a contact with a second surface of the piezoelectric structure. The contact layer includes a material having metal-insulator transition (MIT) characteristics.

The at least one piezoelectric structure may include nanowires. The piezoelectric material may include zinc oxide.

The at least one piezoelectric structure may include nanowires. The semiconductor layer may include one of a Group III-V semiconductor material and a Group II-VI semiconductor material.

The contact layer may include vanadium oxide.

An electrical energy generating system may include two or more electrical energy generators. The two or more electrical energy generators may be electrically connected to each other in one of series, parallel, and series-parallel.

According to an example embodiment, an electrical energy generator includes at least one p-n junction defined by at least one nanostructure contacting a semiconductor layer, and a contact layer forming a contact with the at least one nanostructure. The at least one nanostructure includes a piezoelectric material. The contact layer includes a material having metal-insulator transition (MIT) characteristics.

The at least one nanostructure may include nanowires. The nanowires may include one of zinc oxide (ZnO), lead zirconate titanate (PZT), and polyvinyl idene fluoride (PVDF). The contact layer may include vanadium oxide.

BRIEF DESCRIPTION OF THE DRAWINGS

The foregoing and other features and advantages of some example embodiments will be apparent and more readily appreciated from the following description of non-limiting embodiments, taken in conjunction with the accompanying drawings in which like reference characters refer to the same parts through the different views. The drawings are not necessarily to scale, emphasis instead being placed upon illustrating the principles of some example embodiments. In the drawings.

DETAILED DESCRIPTION

Figure 1:
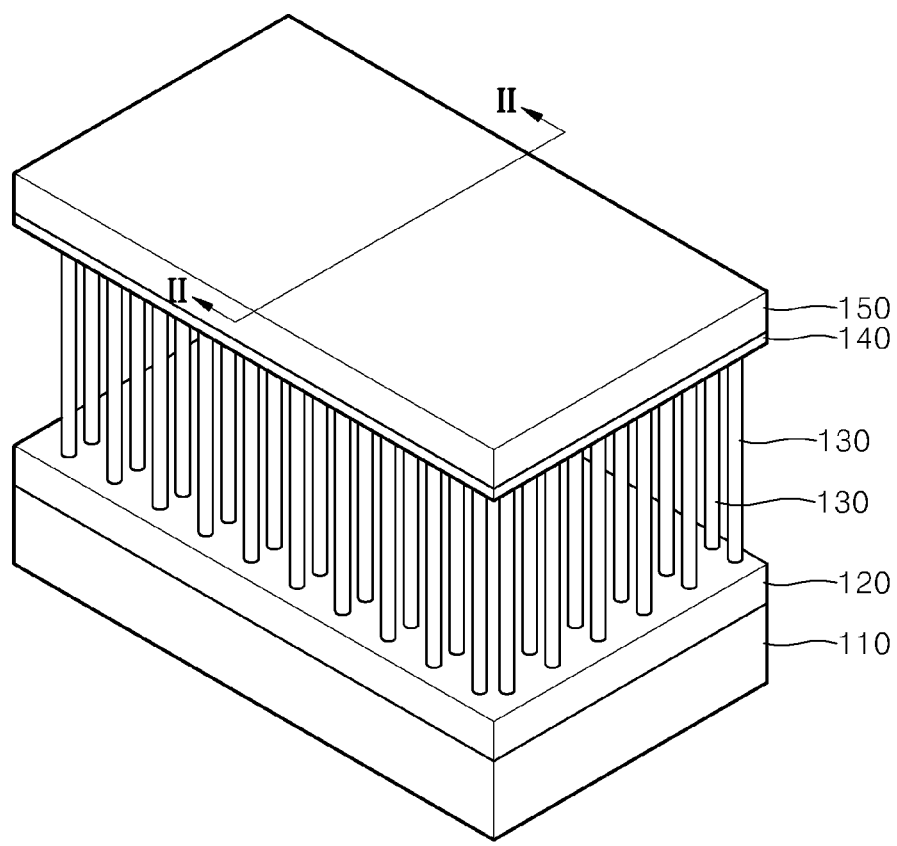
FIG. 1 is a perspective view of an electrical energy generator according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scopes of example embodiments of inventive concepts to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
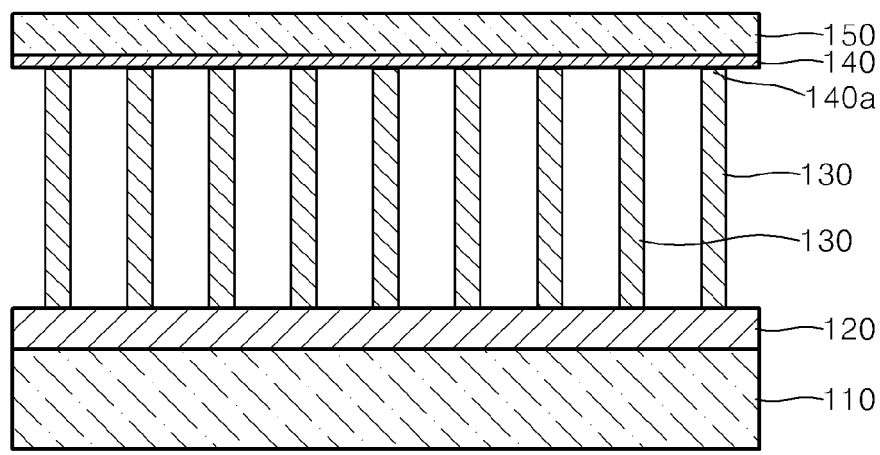
FIG. 2 is a cross-sectional view cut along a line II-II' illustrated in FIG. 1.

FIG. 1 is a perspective view of an electrical energy generator according to an example embodiment. FIG. 2 is a cross-sectional view cut along a line II-II' illustrated in FIG. 1.

Referring to FIGS. 1 and 2, first and second substrates 110 and 150 are spaced apart from each other by a desired (or alternatively predetermined) distance. A semiconductor layer 120 may be formed on the first substrate 110. The first substrate 110 may be a lower substrate. For example, the first substrate 110 may include one of a dielectric material, a transparent deformable material, a polymer material (e.g., polyester, polyethylene, polyethersulfone (PES)), a metal (e.g., aluminum, steel, copper), a semiconductor material (e.g, a silicon substrate), and a transparent conductive oxide. A plurality of elongated members 130 may be formed on the first substrate 110. The elongated members 130 may have an aspect ratio larger than about 20. As an example, the elongated members 130 may be nanostructures, such as a plurality of nanowires 130 that may form p-n junctions with the semiconductor layer 120, but example embodiments are not limited thereto. The semiconductor layer 120 may be formed of a p-type semiconductor material or an n-type semiconductor material. As an example, the semiconductor layer 120 may be formed of a Group III-v semiconductor material (e.g. gallium nitride (GaN)), or a Group II-VI semiconductor material, but example embodiments are not limited thereto. The semiconductor layer 120 may include various materials other than the above-mentioned semiconductor materials. For example, the layer 120 may include at least one of an inorganic material and an organic material.

Referring to FIGS. 1 and 2, the nanowires 130 are formed on the semiconductor layer 120. The nanowires 130 may be spaced regularly, as shown in FIGS. 1 and 2, or spaced irregularly (not shown). The nanowires 130 on the semiconductor layer 120 may be aligned perpendicularly to a top surface of the layer 120 or at an angle other than 90 (not shown) to the semiconductor layer 120. The nanowires 130 may form p-n junctions with the semiconductor layer 120. The nanowires may transform solar energy into electrical energy with photovoltaic characteristics and also be able to transform mechanical vibration energy into electrical energy with piezoelectric characteristics. The nanowires 130 may include semiconductor materials having piezoelectric characteristics such as zinc oxide (ZnO), lead zirconate titanate (PZT) or polyvinylidene fluoride (PVDF). However, the materials for the nanowires 130 are not limited to the above-mentioned materials. As such, the nanowires 130 having piezoelectric characteristics may be formed of an n-type semiconductor material or a p-type semiconductor material. In more detail, the semiconductor layer 120 may be formed of a p-type semiconductor material when the nanowires 130 are formed of an n-type semiconductor material. On the other hand, the semiconductor layer 120 may be formed of an n-type semiconductor material when the nanowires 130 are formed of a p-type semiconductor material. For example, the semiconductor layer 120 may be formed of p-type GaN, and the nanowires 130 may be formed of n-type zinc oxide (ZnO). On the other hand, the semiconductor layer 120 may be formed of n-type GaN, and the nanowires 130 may be formed of p-type zinc oxide (ZnO).

Referring to FIGS. 1 and 2, a contact layer 140 may be formed under the second substrate 150. The second substrate 150 may include a deformable transparent material. In more detail, the second substrate 150 may include, as an example, polyethersulfone (PES), but example embodiments are not limited thereto. It is also possible that the second substrate 150 includes various other materials. The contact layer 140 is formed under the second substrate 150 and contacts upper portions of the nanowires 130. The contact layer 140 may be formed of a material whose contact characteristics with the nanowires 130 can be changed at different conditions. In more detail, the contact layer 140 may be formed of a material having Mott transition characteristics (i.e. metal-insulator transition (MIT) characteristics).

According to an example embodiment, as illustrated in FIGS. 1 and 2, the contact layer 140 may be formed of a material having MIT characteristics in which contact characteristics are varied with respect to temperature variation. For example, the contact layer 140 has metal characteristics at a temperature above a transition temperature, and thus an ohmic contact may be formed between the contact layer 140 and the nanowires 130 when the temperature is higher than the transition temperature. On the other hand, the contact layer 140 may have insulator characteristics at a temperature below the transition temperature, and the contact between the contact layer 140 and the nanowires 130 may form a Schottky contact when the temperature is lower than the transition temperature. An example of a material having MIT characteristics is a vanadium oxide material, such as $VO_2$ or $V_2O_5$, but example embodiments are not limited thereto. In the vanadium oxide material, MIT may occur at a temperature in a range from about 40° C. to about 70° C. The temperature range for MIT may depend upon a composition of the vanadium oxide. According to an example embodiment, vanadium oxide is a material that may be used to form the contact layer; however, example embodiments are not limited thereto. The contact layer 140 can be formed of any material having MIT characteristics with respect to temperature variation.

Figure 5:
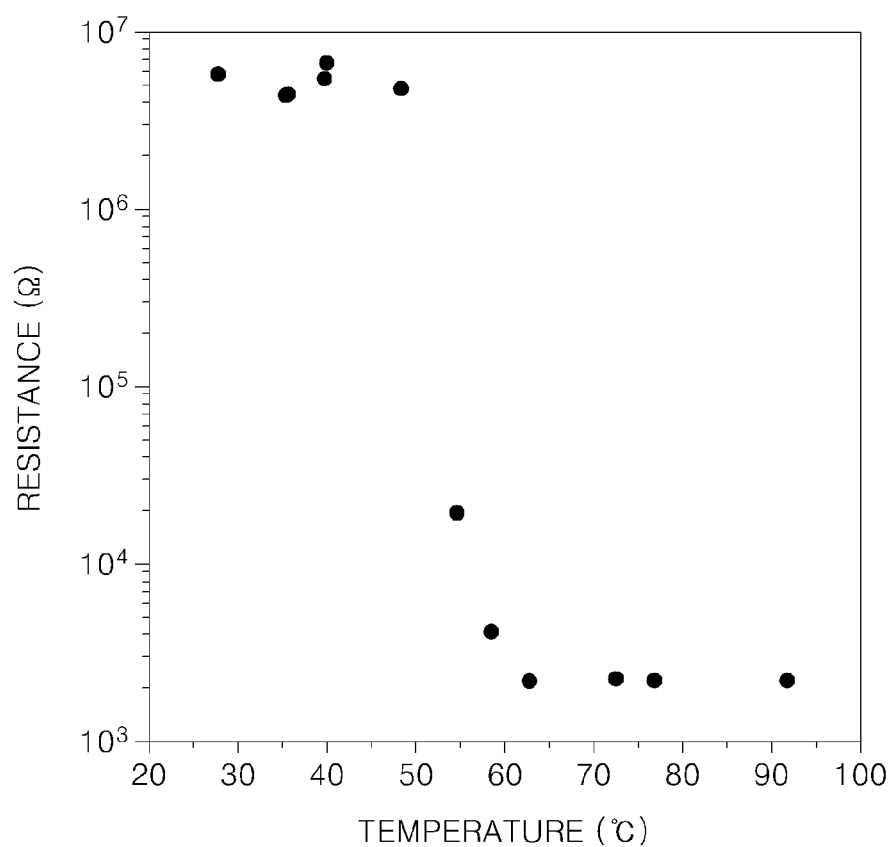
FIG. 5 is a graph showing variation of resistance values of a $VO_2$ thin film at different temperatures.

FIG. 5 is a graph showing variation of the resistance values of a $VO_2$ thin film with respect to temperature variation. The temperature of a 100 nm $VO_2$ thin film was varied from about 30 to about 90° C. Referring to FIG. 5, the resistance value of the $VO_2$ thin film varies about $10^3 \Omega$ in a range of temperature from about 50° C. to about 60° C. When the temperature is in a range above about 55° C., the $VO_2$ thin film has metal characteristics because the $VO_2$ thin film has a relatively low electrical resistance value compared to $VO_2$ thin films at higher temperatures. However, the $VO_2$ thin film has insulator characteristics when the temperature is in a range below about 55° C. In this case, the transition temperature can be about 55° C. across which the metal-insulator transition (MIT) occurs. Accordingly, when the contact layer 140 is formed of a $VO_2$ thin film, an ohmic contact may be formed between the contact layer 140 and the nanowires 130 at the temperature higher than about 55° C. at which the contact layer 140 has metal characteristics. On the other hand, a Schottky contact may be formed between the contact layer 140 and the nanowires 130 at the temperature lower than about 55° C. at which the contact layer 140 has insulator characteristics.

Figure 3:
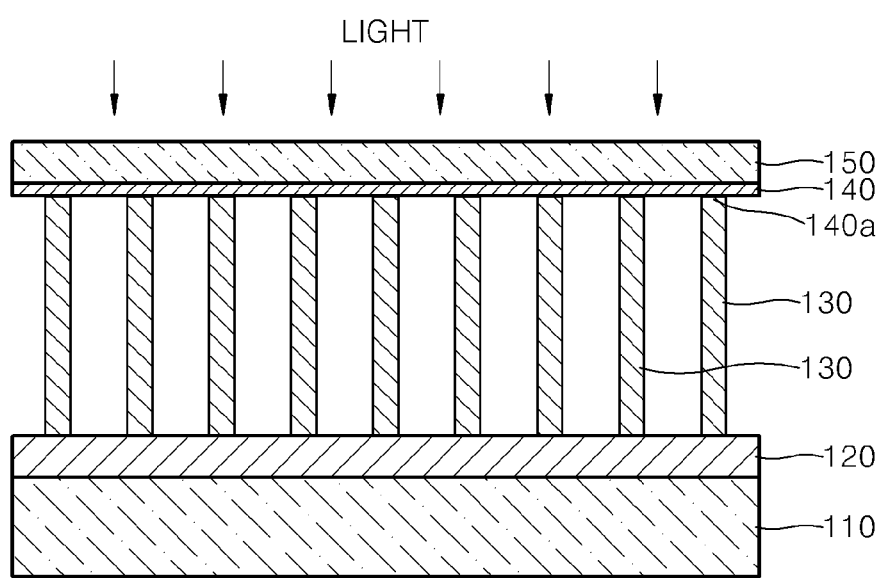
FIG. 3 is a cross-sectional view of the electrical energy generator illustrated in FIG. 1 when electrical energy is generated by using the photovoltaic method with sunlight.

FIG. 3 is a cross-sectional view of the electrical energy generator illustrated in FIG. 1 when electrical energy is generated by using the photovoltaic method with a light source, for example sunlight, but light sources other than sunlight may be used. At a temperature above a transition temperature, an ohmic contact may be formed at an interface 140a between the contact layer 140 and the nanowires 130, and the electrical energy generator may transform solar energy into electrical energy. In more detail, when the contact layer 140 is formed of, for example, a $VO_2$ thin film, an ohmic contact may be formed at the interface 140a between the contact layer 140 and the nanowires 130 at a temperature higher than about 55° C. In this case, the external sunlight is provided through the second substrate 150 that may be formed of a transparent material. Electrons and holes may be separated and then moved away from the p-n junctions formed by the semiconductor layer 120 and the nanowires 130, and thereby electrical energy is obtained.

Figure 4:
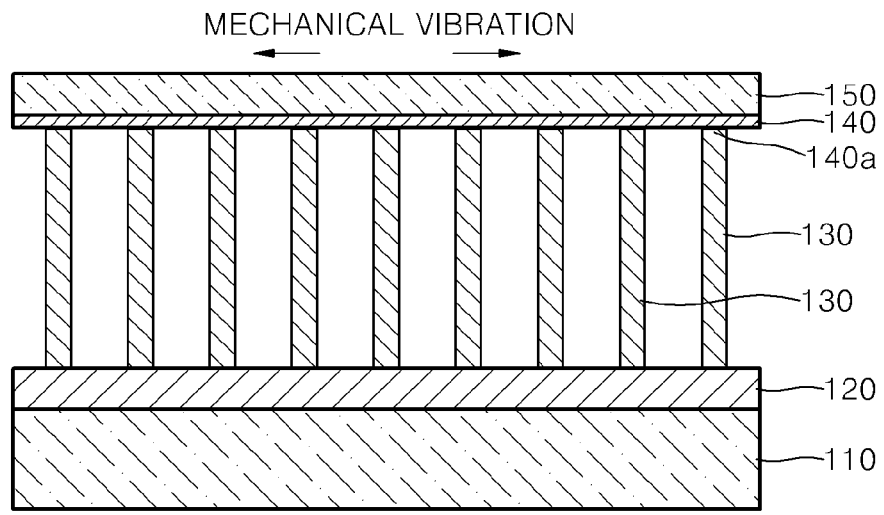
FIG. 4 is a cross-sectional view of the electrical energy generator illustrated in FIG. 1 when electrical energy is generated by using the piezoelectric method with mechanical vibration.

FIG. 4 is a cross-sectional view of the electrical energy generator illustrated in FIG. 1 when electrical energy is generated by using the piezoelectric method with mechanical vibration. At a temperature below the transition temperature, a Schottky contact may be formed at the interface 140a between the contact layer 140 and the nanowires 130, and the electrical energy generator may transform mechanical vibration energy into electrical energy. In more detail, when the contact layer 140 is formed of, for example, a $VO_2$ thin film, a Schottky contact may be formed at the interface 140a between the contact layer 140 and the nanowires 130 at a temperature lower than about 55° C. In this case, the second substrate 150 may be vibrated by external mechanical force, and then electrical energy may be generated due to friction occurred between the contact layer 140 and the nanowires 130. When the contact layer 140 moves relatively to the nanowires 130, upper portions of the nanowires 130 having interfaces 140a with the contact layer 140 may experience deformation (e.g. bending) due to the horizontal and/or vertical motion of the contact layer 140. Accordingly, the vibration of the second substrate 150 may repeatedly cause deformation and relaxation processes on the upper portions of the nanowires 130 by applying stresses repeatedly. The repeated deformation and relaxation processes on the upper portion may create potential difference between the upper portion and the lower portion of each nanowire 130, which may cause flow of electrons due to the presence of the potential difference and thus generate electrical energy.

According to some example embodiments, the contact layer 140 may be formed of a material having MIT characteristics based on temperature variation. The characteristics of the contacts formed between the contact layer 140 and the nanowires 130 may be changed as varying the temperature. As such, solar energy may be transformed into electrical energy when the contact layer 140 has an ohmic contact at a temperature higher than a transition temperature. The mechanical vibration energy may be transformed into electrical energy when the contact layer 140 has a Schottky contact at a temperature lower than the transition temperature. Therefore, different types of external energies may be efficiently transformed into electrical energy.

Figure 6:
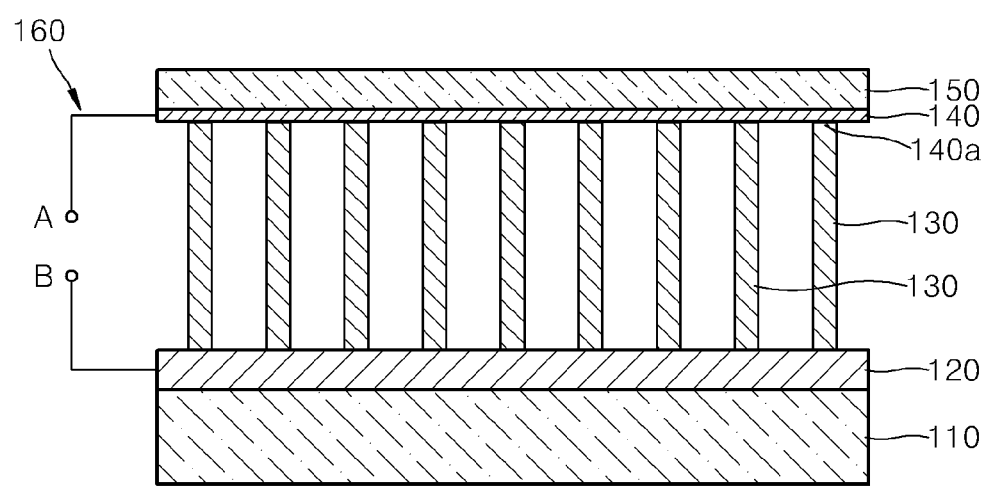
FIG. 6 is a cross-sectional view of an electrical energy generator according to an example embodiment.

FIG. 6 is a cross-sectional view of the electrical energy generator according to an example embodiment. Referring to FIG. 6, at least one electrical conductor 160 may be connected to the contact layer 140 and at least one electrical conductor 160 connected to the semiconductor layer 120. The electrical conductors 160 correspond to terminals A and B for withdrawing electrical energy from the electrical energy generating device according to an example embodiment. The electrical conductors 160 may include metal wires, but example embodiments are not limited thereto.

Figure 7:
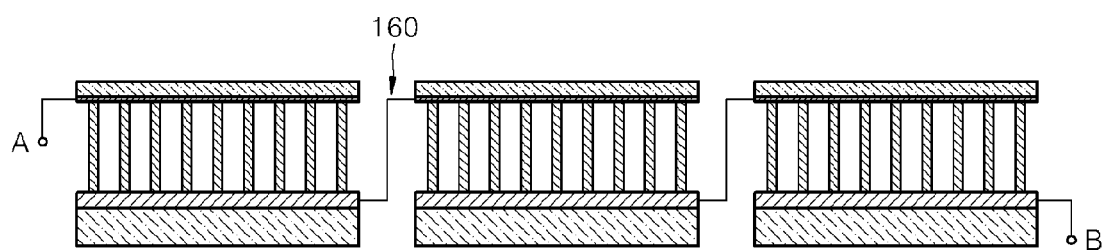
FIGS. 7 and 8 are cross-sectional views of electrical energy generating systems according to some example embodiments.
Figure 8:
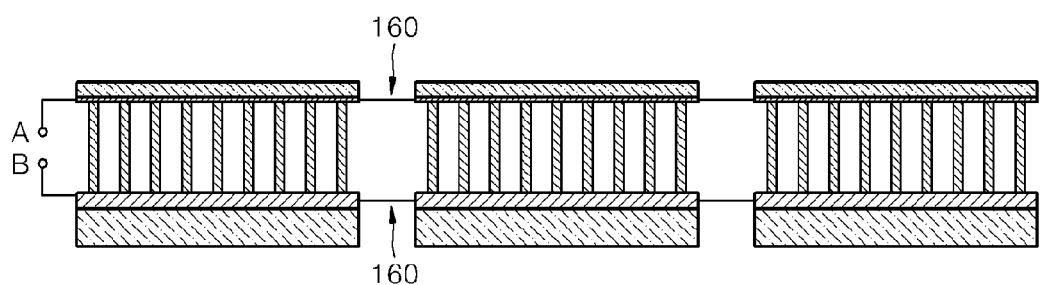

FIGS. 7-8 are cross-sectional views of electrical energy generating systems according to some example embodiments. Referring to FIGS. 7-8, two or more electrical energy generating devices may be electrically connected by electrical conductors 160. The electrical conductors 160 on the outermost electrical energy generating devices correspond to terminals A and B for withdrawing electrical energy from the electrical energy generating systems according to some example embodiments. Other electrical conductors may be used to electrically connect two or more electrical energy generating devices in series, as shown in FIG. 7, or in parallel, as shown in FIG. 8, or in series-parallel (not shown). However, example embodiments are not limited thereto. One having ordinary skill in the art would recognize that alternative and/or additional configurations for electrically connecting two or more electrical energy generating devices in order to form an electrical energy generating system for achieving the desired electrical current, voltage, and/or power output.

As described above, according to one or more of the above example embodiments, an ohmic contact or Schottky contact formed between nanowires and the contact layer may be varied with respect to the temperature. As such, solar energy or mechanical vibration energy may be transformed into electrical energy.

Descriptions of features or aspects within each example embodiment should typically be considered as available for other similar features or aspects in other example embodiments. Further, while some example embodiments have been particularly shown and described, it will be understood by one of ordinary skill in the art that variations in form and detail may be made therein without departing from the spirit and scope of the claims.

What is claimed is:

1. An electrical energy generator comprising:
   a first substrate;
   a second substrate over the first substrate;
   a plurality of elongated members between the first substrate and the second substrate,
   the plurality of elongated members including at least one elongated member containing a piezoelectric material;
   a contact layer on one of the first substrate and the second substrate,
      the contact layer including a material having metal-insulator transition (MIT) characteristics, and
      the contact layer forming a contact with a first end of the at least one elongated member containing a piezoelectric material.

2. The electrical energy generator of claim 1, wherein
   one of the first substrate and the second substrate includes a semiconductor layer, and
   a second end of the at least one elongated member containing a piezoelectric material forms a p-n junction with the semiconductor layer.

3. The electrical energy generator of claim 2, wherein
   the at least one elongated member containing a piezoelectric material is a nanowire including an n-type semiconductor material, and
   the semiconductor layer includes a p-type semiconductor material.

4. The electrical energy generator of claim 2, wherein
   the at least one elongated member containing a piezoelectric material is a nanowire including a p-type semiconductor material, and
   the semiconductor layer includes an n-type semiconductor material.

5. The electrical energy generator of claim 1, wherein
   the plurality of elongated members include nanowires.

6. The electrical energy generator of claim 3, wherein
   nanowires include one of zinc oxide (ZnO), lead zirconate titanate (PZT), and polyvinylidene fluoride (PVDF).

7. The electrical energy generator of claim 1, wherein
   the material having metal-insulator transition (MIT) characteristics is a material in which contact characteristics vary based on temperature variation.

8. The electrical energy generator of claim 7, wherein
   the contact between the first end of the at least one elongated member containing a piezoelectric material and the contact layer is an ohmic contact at a temperature above a transition temperature of the material having metal-insulator transition (MIT) characteristics.

9. The electrical energy generator of claim 8, wherein
   the contact between the first end of the at least one elongated member containing a piezoelectric material and the contact layer is a Schottky contact at a temperature below a transition temperature of the material having metal-insulator transition (MIT) characteristics.

10. The electrical energy generator of claim 7, wherein
    the contact layer includes vanadium oxide.

11. The electrical energy generator of claim 1, wherein
    at least one of the first substrate and the second substrates includes a transparent deformable material.

12. The electrical energy generator of claim 1, wherein
    one of the first substrate and the second substrate includes a semiconductor layer, and
    the semiconductor layer includes at least one of an inorganic material and an organic material.

13. The electrical energy generator of claim 1, wherein the plurality of elongated members are one of
   aligned substantially perpendicular to one of the first substrate and the second substrate, and
   aligned at a non-perpendicular and non-parallel angle to one of the first substrate and the second substrate.

14. An electrical energy generator comprising:
a semiconductor layer;
at least one piezoelectric structure containing a piezoelectric material,
   the piezoelectric structure including a first surface that forms a p-n junction with the semiconductor layer; and
a contact layer that forms a contact with a second surface of the piezoelectric structure,
   the contact layer including a material having metal-insulator transition (MIT) characteristics.

15. The electrical energy generator of claim 14, wherein
the at least one piezoelectric structure includes nanowires, and the
piezoelectric material includes zinc oxide.

16. The electrical energy generator of claim 14, wherein
the at least one piezoelectric structure includes nanowires, and
the semiconductor layer includes one of a Group III-V semiconductor material and a Group II-VI semiconductor material.

17. The electrical energy generator of claim 14, wherein the contact layer includes vanadium oxide.

18. An electrical energy generating system comprising:
two or more electrical energy generators according to claim 14,
the two or more electrical energy generators being electrically connected to each other in one of series, parallel, and series-parallel.

19. An electrical energy generator comprising:
at least one p-n junction defined by at least one nanostructure contacting a semiconductor layer,
the at least one nanostructure including a piezoelectric material; and
a contact layer forming a contact with the at least one nanostructure,
   the contact layer including a material having metal-insulator transition (MIT) characteristics.

20. The electrical energy generator of claim 19, wherein
the at least one nanostructure includes nanowires,
the nanowires include one of zinc oxide (ZnO), lead zirconate titanate (PZT), and polyvinylidene fluoride (PVDF), and
the contact layer includes vanadium oxide.

* * * * *